United States Patent [19]

Kaneko et al.

[11] Patent Number: 4,796,980
[45] Date of Patent: Jan. 10, 1989

[54] FERROELECTRIC LIQUID CRYSTAL OPTICAL MODULATION DEVICE WITH REGIONS WITHIN PIXELS TO INITIATE NUCLEATION AND INVERSION

[75] Inventors: Shuzo Kaneko, Tokyo; Tsutomu Toyono; Junichiro Kanbe, both of Yokohama, all of Japan

[73] Assignee: Canon Kabushiki Kaisha, Tokyo, Japan

[21] Appl. No.: 30,569

[22] Filed: Mar. 27, 1987

[30] Foreign Application Priority Data

Apr. 2, 1986 [JP] Japan ................................ 61-075867
Apr. 2, 1986 [JP] Japan ................................ 61-075868

[51] Int. Cl.$^4$ .............................................. G02F 1/13
[52] U.S. Cl. ................................ 350/350 S; 350/333; 350/341
[58] Field of Search ............. 350/333, 334, 341, 350 S

[56] References Cited

U.S. PATENT DOCUMENTS

| | | | |
|---|---|---|---|
| 4,247,174 | 1/1981 | Walter ................................ | 350/340 |
| 4,563,059 | 1/1986 | Clark et al. ......................... | 350/330 |
| 4,655,561 | 4/1987 | Kanbe et al. ..................... | 350/350 S |
| 4,692,779 | 9/1987 | Ando et al. ....................... | 350/330 X |
| 4,709,995 | 12/1987 | Kuribayashi et al. ........... | 350/350 S |
| 4,712,877 | 12/1987 | Okada et al. ..................... | 350/350 S |
| 4,747,671 | 5/1988 | Takahashi et al. ................ | 350/336 |

FOREIGN PATENT DOCUMENTS

A0083882  7/1983  European Pat. Off. .
A13500166 7/1985  Fed. Rep. of Germany .
A18606506 11/1986 PCT Int'l Appl. .

OTHER PUBLICATIONS

Orihara et al., "Switching Characteristics of Ferroelectric Liquid Crystal DOBAMBC", Jpn. J. Appl. Phys, vol. 23 pp. 1274–1277 Oct., 1984.

Primary Examiner—Stanley D. Miller
Assistant Examiner—Richard F. Gallivan
Attorney, Agent, or Firm—Fitzpatrick, Cella, Harper & Scinto

[57] ABSTRACT

An optical modulation device comprises a pair of substrates respectively having electrodes thereon arranged so as to form a pixel at an intersection thereof, and an optical modulation material disposed at the pixel. The pixel has regions of the optical modulation material having mutually different threshold characteristics.

21 Claims, 7 Drawing Sheets

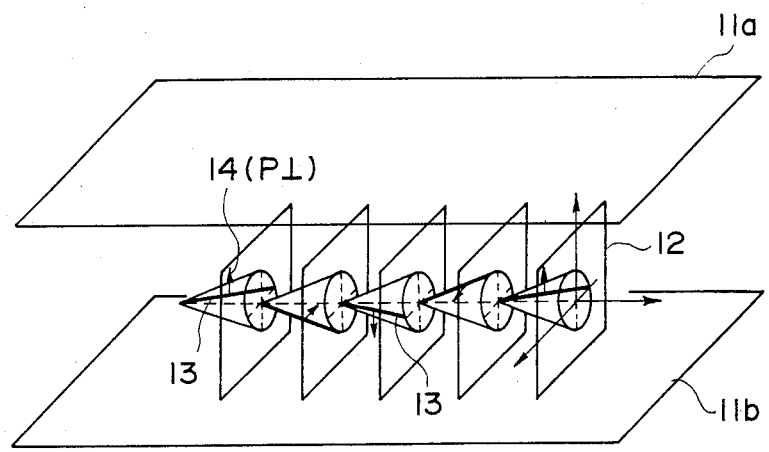
F I G. 1
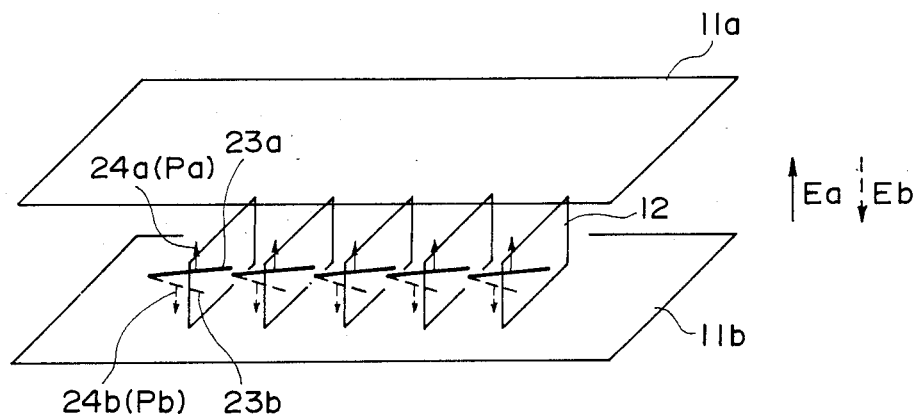
F I G. 2

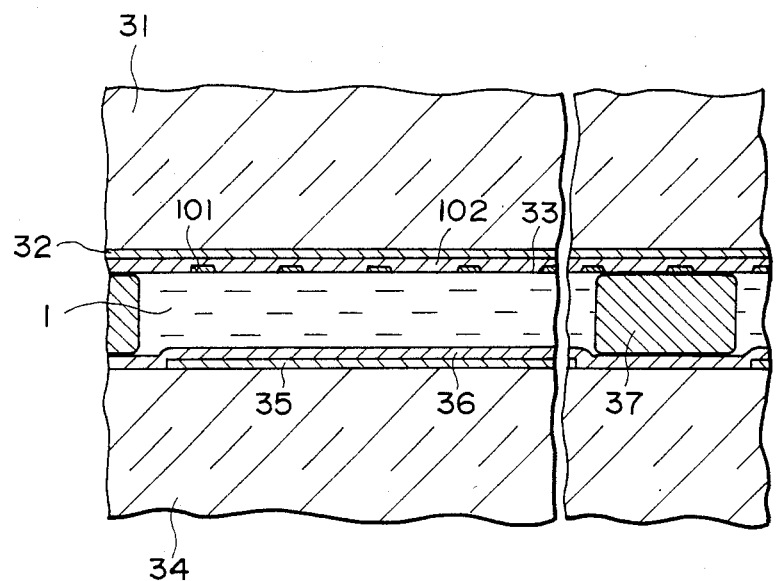
F I G. 3
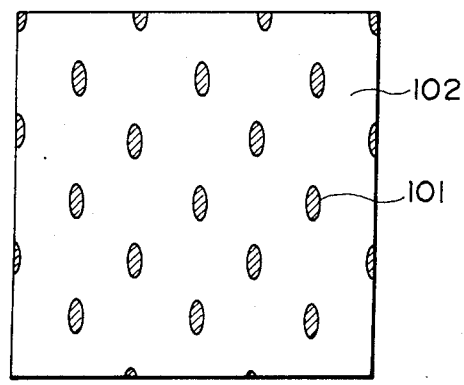
F I G. 4

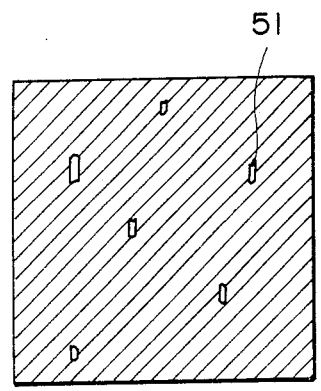
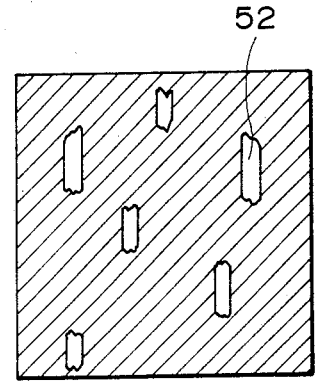
F I G. 5A   F I G. 5B
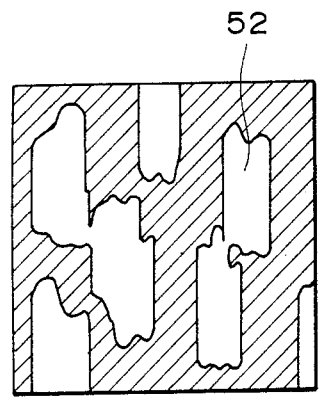
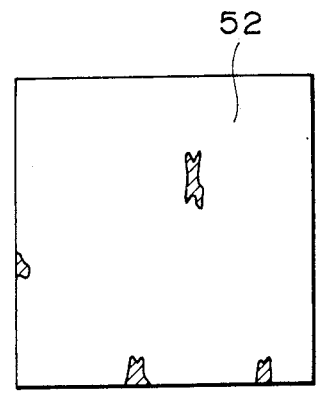
F I G. 5C   F I G. 5D

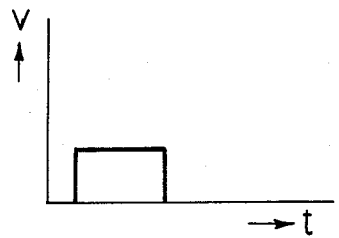
F I G. 8A
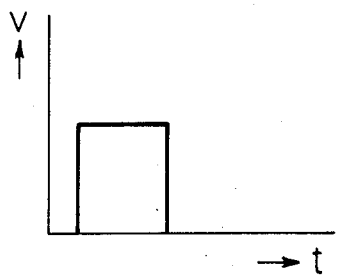
F I G. 8B
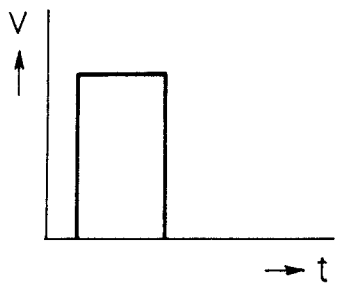
F I G. 8C
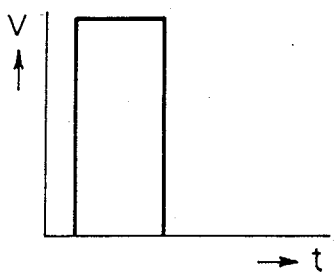
F I G. 8D

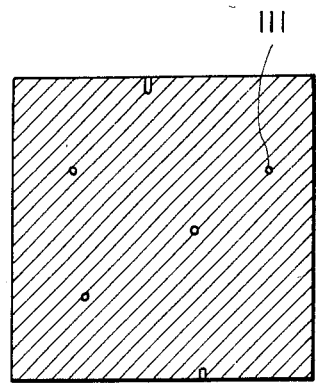
F I G. 11A
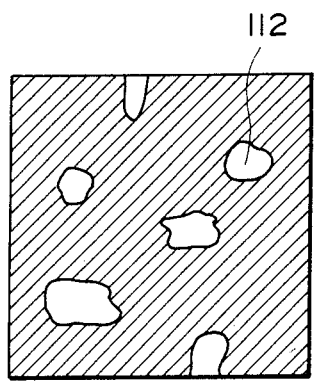
F I G. 11B
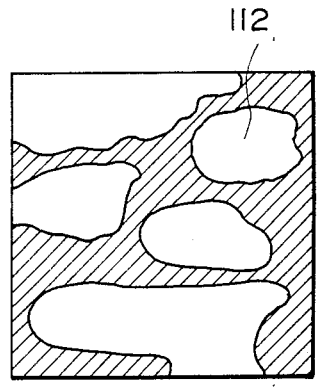
F I G. 11C
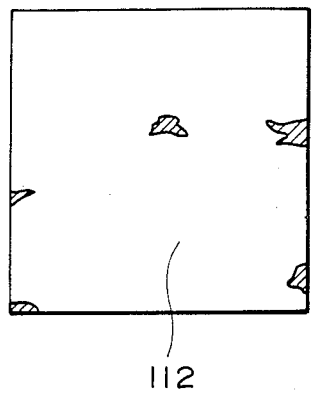
F I G. 11D

FERROELECTRIC LIQUID CRYSTAL OPTICAL MODULATION DEVICE WITH REGIONS WITHIN PIXELS TO INITIATE NUCLEATION AND INVERSION

FIELD OF THE INVENTION AND RELATED ART

The present invention relates to an optical modulation device for a display panel and particularly to a display panel using a liquid crystal, particularly a ferroelectric liquid crystal, showing at least two stable states.

In a liquid crystal-television panel using a conventional active matrix driving system, a thin film transistor is disposed at each pixel so as to form a matrix of TFTs, and while a gate-on pulse is applied to a TFT so as to make continuous the source-drain channel, a picture image signal is applied through the source to be stored in a capacitor, whereby a liquid crystal, e.g., a twisted nematic (TN)-liquid crystal, at the corresponding pixel, is driven based on the stored image signal. A gradational display is also performed by modulating the voltage of the image signal at that time.

However, such a television panel of the active matrix driving type using a TN-liquid crystal involves several problems such that the TFTs used have a complicated structure, thus requiring a large number of production steps and a high production cost, and it is difficult to form a thin film of a semiconductor such as polysilicon or amorphous silicon in a large area.

On the other hand, a display panel of a passive matrix driving type has been known as one which can be produced at a low production cost. In this type of display panel, however, a ratio (duty factor) of a time period in which an effective electric field is applied to a selected pixel during a period for scanning a whole picture (one frame) is decreased at a rate of 1/N, so that a crosstalk phenomenon can occur and a picture of a high contrast cannot be obtained. Furthermore, as the duty factor is lowered, it becomes difficult to control the gradation of respective pixels through voltage modulation. Thus, this type of display system is not adapted to a display panel requiring signal lines arranged at a higher density, particularly a liquid crystal television panel.

SUMMARY OF THE INVENTION

An object of the present invention is to solve the above-mentioned problems and provide an optical modulation device adapted for providing and driving a display panel having pixels arranged at a high density over a wide area.

A specific object of the present invention is to provide an optical modulation device adapted for gradational display.

According to a first aspect of the present invention, there is provided an optical modulation device comprising: a pair of substrates respectively having electrodes thereon arranged so as to form a pixel at an intersection of the electrodes, and an optical modulation material disposed at the pixel; said pixel having regions of the optical modulation material having mutually different threshold characteristics. More specifically, the optical modulation device comprises: a plurality of pixels arranged twodimensionally, each pixel comprising a first electrode and a second electrode disposed opposite to each other and an optical modulation material disposed between the first and second electrodes; each pixel having regions with mutually different alignment control powers for aligning the optical modulation material. The optical modulation device can be driven to display a gradation in a pixel by applying a pulse signal with a varying peak value, duration or a number of pulses depending on given gradation data.

According to a second aspect of the present invention, there is provided an optical modulation device comprising: a plurality of pixels arranged twodimensionally, each pixel comprising a first electrode and a second electrode disposed opposite to each other and an optical modulation material disposed between the first and second electrodes; each pixel having portions capable of having a locally different electric field intensity distributed dispersely in the pixel when an electric field is applied between the first and second electrodes.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views each illustrating a ferroelectric liquid crystal device used in the present invention;

FIG. 3 is a sectional view of an optical modulation device according to the present invention; FIG. 4 is a plan view of the alignment control layer therein;

FIGS. 5A-5D are explanatory views each illustrating a state of inversion at a pixel;

FIGS. 6A-6D, FIGS. 7A-7D and FIGS. 8A-8D respectively show an example of a set of pulse signals used in the present invention;

FIGS. 11A-11D are explanatory views each illustrating a state of inversion at a pixel.

DESCRIPTION OF THE PREFERRED EMBODIMENTS

Figure 6A:
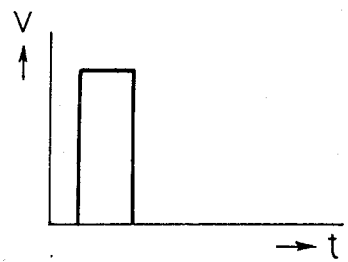

As an optical modulation material used in a driving method according to the present invention, a material showing at least two stable states including a first optically stable state (assumed to provide, e.g., a bright state) and a second optically stable state (assumed to provide, e.g., a dark state) depending upon an electric field applied thereto, particularly a liquid crystal having the above-mentioned property, may be used most suitably.

Preferable liquid crystals showing at least two stable states which can be used in the optical modulation device according to the present invention are chiral smectic liquid crystals having ferroelectricity. Among them, chiral smectic C phase (SmC*), H phase (SmH*), I phase (SmI*), F phase (SmF*) or G phase (SmC*) liquid crystals are suitable therefor. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Kotai Butsuri (Solid State Physics)" 16 (141), 1981 "Liquid Crystal", etc. Ferroelectric liquid crystals disclosed in these publications may be used in the present invention.

More particularly, examples of ferroelectric liquid crystal compounds used in the method according to the present invention are decyloxybenzylidene-p'-amino-2-methylbutylcinnamate (DOBAMBC), hexyloxybenzylidene-p'-amino-2-chloropropylcinnamate (HOBACPC), 4-O-(2-methyl)-butylresorcylidene-4'-octylaniline (MBRA 8), etc.

When a device is constituted by using these materials, the device may be supported with a block of copper, etc., in which a heater is embedded in order to realize a temperature condition where the liquid crystal compounds assume an SmC*- or SmH*-phase.

Referring to FIG. 1, there is schematically shown an example, of a ferroelectric liquid crystal cell. Reference numerals 11a and 11b denote substrates (glass plates) on which a transparent electrode of, e.g., $In_2O_3$, $SnO_2$, ITO (Indium Tin Oxide), etc., is disposed, respectively. A liquid crystal of an SmC*-phase, in which liquid crystal molecular layers 12 are oriented perpendicular to surfaces of the glass plates, is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the substrates 11a and 11b, a helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other are dispsed on the upper and the lower surfaces of the glass plates, the liquid crystal cell thus arranged functions as a liquid crystal optical modulation device, optical characteristics of which vary depending upon the polarity of an applied voltage. Further, when the thickness of the liquid crystal cell is sufficiently thin (e.g., 1μ), the helical structure of the liquid crystal molecules is unwound without application of an electric field whereby the dipole moment assumes either of the two states, i.e., Pa in an upper direction 24a or Pb in a lower direction 24b as shown in FIG. 2. When electric field Ea or Eb higher than a certain threshold level and different from each other in polarity as shown in FIG. 2 is applied to a cell having the above-mentioned characteristics, the dipole moment is directed either in the upper direction 24a or in the lower direction 24b depending on the vector of the electric field Ea or Eb. In correspondence with this, the liquid crystal molecules are oriented to either a first stable state 23a or a second stable state 23b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented to the first stable state 23a. This state is stably retained even if the electric field is removed. On the other hand, when the electric field Eb of which direction is opposite to that of the electric field Ea is applied thereto, the liquid crystal molecules are oriented to the second stable state 23b, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. An example of an electrooptical device having a matrix electrode structure and using a ferroelectric liquid crystal of this type has been proposed by, e.g., Clark and Lagerwall in U.S. Pat. No. 4,367,924.

Next, the liquid crystal electro-optical device according to the present invention will be explained in detail. FIG. 3 shows an embodiment.

The device comprises a substrate 31 on one side, which is composed of glass, plastic, etc. On the substrate 31, a first electrode 32 of, e.g., ITO (indium-tin-oxide), and an alignment control layer 33 are disposed in a laminated form.

The other substrate 34 is disposed opposite to the substrate 31, and between the substrates 34 and 31, an optical modulation material 1 is disposed in a sandwiched form. On the substrate 34, a second electrode 35 and an alignment control layer 36 are disposed in a laminated form, and the spacing between the substrates 31 and 34 is controlled by spacers 37.

FIG. 4 is a plan view of the alignment control layer 33 formed on the above-mentioned substrate 31. The alignment control layer 33 comprises regions of different alignment control powers, i.e., first regions 101 with a first alignment control power and a second region 102 with a second alignment control power, and the first regions 101 are distributed dispersely or uniformly in a discrete form in the second region 102. Accordingly, while the first regions 101 and the second region 102 have uniaxial orientation axes (e.g., rubbing-treated axes) in the same direction, the alignment control powers of these regions are different from each other.

The substrate 31 having an alignment control layer 33 as described above may be obtained, for example, through a method comprising: forming a layer of ITO as the electrode 32 on the substrate 31 of glass, plastic, etc., uniformly to a thickness of about 3000 Å by sputtering; forming an about 1000 to 2000 Å-thick polyvinyl alcohol film (corresponding to the second alignment control power region 102) by uniformly applying a layer of an aqueous polyvinyl alcohol solution on the substrate 31 through spinner coating or dipping, which is then subjected to heat treatment at about 180° C. for 30 minutes for curing; further coating the polyvinyl alcohol film, with a polyimide solution (e.g., a solution in N-methylpyrrolidone of a condensate between pryomellitic anhydride and 4,4'-diaminodiphenyl ether) by spraying or through mesh, followed by heating at about 180° C. for 1 hour to form polyimide portions (corresponding to the first alignment control power regions 101); and applying a uniaxial orientation treatment such as rubbing to the overall coating.

For the purpose of providing an alignment control layer with uniaxial orientation axes of different alignment control powers, in addition to the above-mentioned combination of polyvinyl alcohol/polyimide, it is also possible to use another combination of different organic polymers or substances such as polyvinyl alcohol/polyamide, polyvinyl alcohol/silane coupling agent, polyimide/polyamide, and polyimide/silane coupling agent. In the present invention, it is further possible to use a combination of first alignment control power regions 101 composed of a film of an inorganic insulating substance such as SiO or $SiO_2$ and a second control power region 102 composed of an organic polymer film, or a combination of the reverse order.

The other alignment control layer 36 may be a uniform film of polyvinyl alcohol, polyimide, polyamide, silane coupling agent, etc., subjected to a uniaxial orientation treatment such as rubbing.

In the present invention, the first alignment control power regions 101 and the second alignment control power region 102 have mutually different alignment control powers over a ferroelectric liquid crystal, the threshold voltage of the ferroelectric liquid crystal become different between at the first regions 101 and at the second region. As a result, the first regions 101 and the second region 102 provide different inversion initiation voltages. For example, in the above-mentioned combination of polyvinyl alcohol/polymide, there is a tendency that polyimide constituting the first regions provides a lower threshold voltage than polyvinyl alcohol constituting the second region, so that the first regions 101 provide inversion nuclei.

In a preferred embodiment according to the present invention, a liquid crystal device using a combined alignment control film of polyvinyl alcohol/polyimide may be supplied with an AC application treatment. The AC applied for this purpose may comprise a frequency of 10 Hz to 1 KHz and a voltage of about 20 V to 200 V and has a function of providing a uniform alignment state with a large tilt angle to a ferroelectric liquid crystal in contact with the polyvinyl alcohol alignment control film. As a ferroelectric liquid crystal in a uniform alignment state has a larger threshold voltage than the ferroelectric liquid crystal in a splay alignment state, it is ensured that the ferroelectric liquid crystal in contact with the polyimide film and in the splay alignment state has a relatively low threshold voltage.

Herein, the term "uniform alignment state" refers to a state wherein the helical structure of ferroelectric liquid crystal molecules is unwound under no electric field to align the molecules so as to provide projections on both substrates of the molecules adjacent to the respective substrates, which projections are parallel or substantially parallel to each other, and the term "splay alignment state" refers to a state wherein the above-mentioned molecular projections on both substrates cross each other with a certain angle. As a result, the projections of ferroelectric liquid crystal molecule adjacent to one substrate on the substrate are different under no electric field whether they are in the uniform alignment region or in the splay alignment region. Generally, when an AC is applied to a ferroelectric liquid crystal in contact with a polyvinyl alcohol alignment film, a uniform alignment state results, whereas a ferroelectric liquid crystal in contact with a polyimide alignment film is not transformed into a uniform alignment state but remains in a splay alignment state even when subjected to an AC application treatment. Further, a ferroelectric liquid crystal shows a smaller threshold voltage when it is in a splay alignment state than in a uniform alignment state.

FIGS. 5A-5D schematically illustrate inversion behavior of ferroelectric liquid crystal molecules due to voltage application in a cell of an ordinary type.

Soon after the initiation of voltage application, inversion nuclei 51 are caused to occur partially in a voltage-applied region (FIG. 5A). After that, as the progress of time under voltage application, inverted portions are gradually developed and enlarged from the inversion nuclei 51 to form inverted regions 52 as shown in FIGS. 5B and 5C. As the voltage is applied further, almost all portions are inverted (FIG. 5D) to finally result in the entirety of the voltage-applied region being in the inverted state. The behavior of inversion is described, e.g., by Orihara and Ishibashi, "Switching Characteristic of Ferroelectric Liquid Crystal DOBAMBC", Japanese Journal of Applied Physics, Vol. 23, No. 10, p.p. 1274 -1277, October 1984.

Further, in the present invention, a TN-liquid crystal, etc., may be used as an optical modulation material in addition to the above-described ferroelectric liquid crystal.

In this way, the present invention provides a method of intentionally forming an inversion nucleus in a pixel and forming an inverted region with the inversion nucleus as the center, whereby inversion of the ferroelectric liquid crystal is started at the first regions 101 formed in the alignment control layer 33 as centers, and the size of inverted regions developed around the regions 101 are determined depending on the number of pulses, pulse duration and peak-value of pulse signals applied to the pixel.

In applying a line-sequential writing scheme using matrix electrodes comprising scanning electrodes and information electrodes to the optical modulation device according to the present invention, it is preferred to adopt a driving scheme as disclosed in Japanese Laid-Open Patent Application No. 193427/1984 (GB-2141279 A). More specifically, in the present invention, a ferroelectric liquid crystal at pixels on a writing line may be once uniformly oriented to one stable state corresponding to the bright level, and pulse signals, as will be explained with reference to FIGS. 6-8, may be applied from information electrodes, whereby the ferroelectric liquid crystal is partially or wholly inverted to the other state corresponding to the white level. The above operation may be repeated line by line to provide a gradational display of one whole picture.

FIGS. 6-8 show typical examples of voltages applied between the first electrode 32 and the second electrode 35. A gradational display may be provided by the signals shown in any of FIGS. 6-8, of which FIGS. 6A-6D show pulse signals with various pulse durations, FIGS. 7A-7D show pulse signals with various numbers of pulses, and FIGS. 8A-8D show pulse signals with various voltage values (peak-values). FIGS. 6A-8A schematically correspond to FIG. 5A; FIGS. 6B-8B to FIG. 5B; FIGS. 6C-8C to FIG. 5C; and FIGS. 6D-8D to FIG. 5D.

Figure 7A:
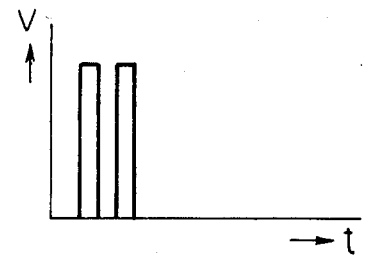
Figure 6B:
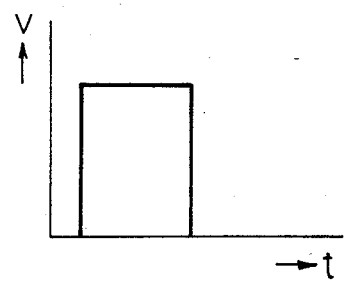
Figure 7B:
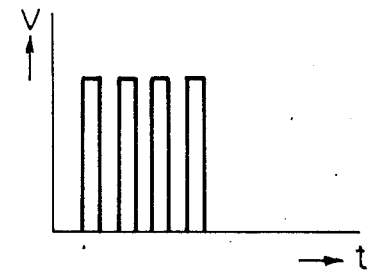
Figure 6C:
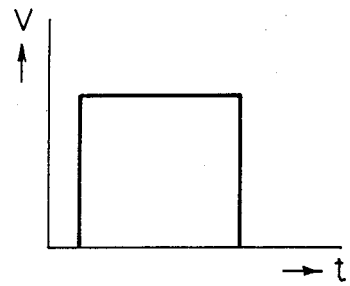
Figure 7C:
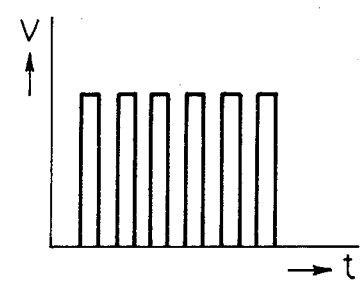
Figure 6D:
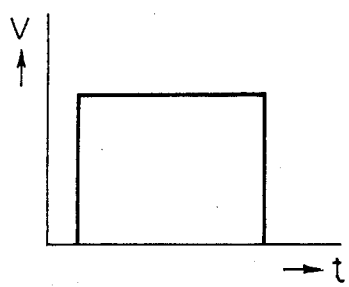
Figure 7D:
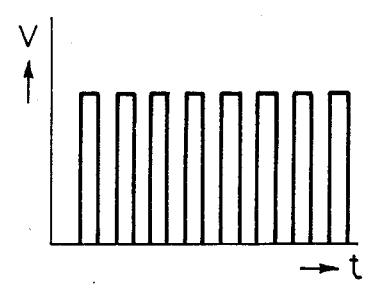

FIGS. 6A-6D and FIGS. 7A-7D respectively show a set of voltage signals most suitably applied to the optical modulation device according to the present invention. More specifically, when a voltage signal having a pulse waveform shown in FIGS. 6A or 7A is applied between the electrodes 32 and 35, an optical modulation material at the regions 101 where inversion nuclei are first formed starts to cause inversion to form nuclei, which are gradually enlarged. If the application of the voltage is terminated at this time, the optical modulation material retians the state as it is in memory when the material has bistability. Then, when voltage signals shown in FIGS. 6B-6D or FIGS. 7B-7D are applied, the inverted portion is enlarged correspondingly, and the inverted regions resultant at the respective time of termination of the voltage application are memorized to provide a gradational display.

According to the method shown in FIGS. 8A–8D wherein pulse signals having different peak-values are applied, inversion nuclei as explained above are formed at the application of a pulse as shown in FIG. 8A. When pulse signals having larger voltage values as shown in FIGS. 8B–8D are applied, the resultant inverted regions are enlarged as the response speed of the optical modulation material is increased correspondingly. Also in this case, however, it is believed that a portion having a small inversion threshold voltage is first inverted to form a nucleus, which is then enlarged within a given pulse duration to provide an enlarged inverted region. In this case, if the pulse application period is too long, the ferroelectric liquid crystal is inverted even at the region 102, so that the pulse application time may be adjusted appropriately.

Figure 9:
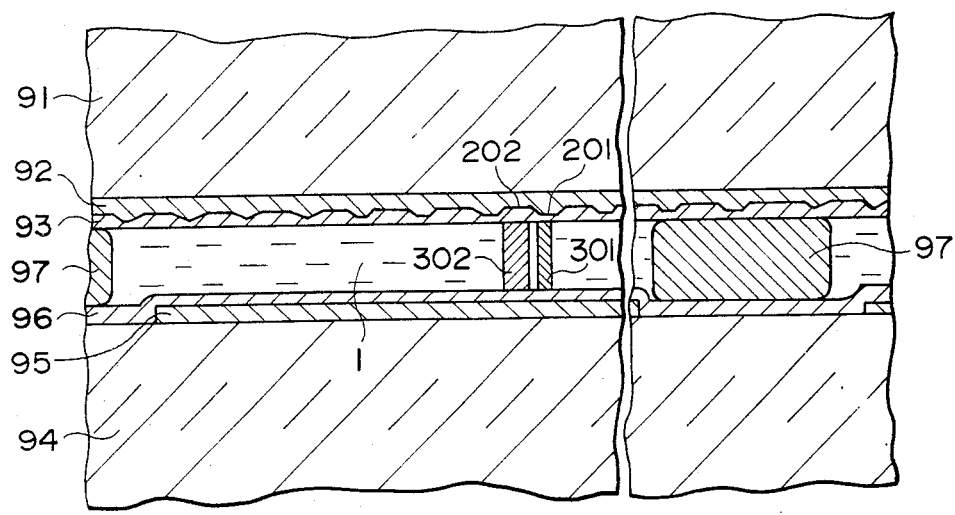
FIG. 9 is a sectional view of an optical modulation device according to the present invention.

Next, another liquid crystal optical device, as an embodiment of the optical modulation device according to the present invention, is explained with reference to FIG. 9.

The device comprises a substrate 91 on one side, which is composed of glass, plastic, etc. On the substrate 91, a first electrode 92 of, e.g., ITO, and an alignment control layer 93 are disposed in laminated form.

Opposite the substrate 91 is disposed the other substrate 94, on which a second electrode 95 and an alignment control layer 96 are formed, so as to sandwich an optical modulation material 1 between the substrates 91 and 94.

In this embodiment, the first electrode 92 on the substrate 31 is formed in varying thickness to have discrete fine projections 201. Further, the spacing between the substrates 91 and 94, i.e., the spacing between the alignment control films 93 and 96, is controlled at 1 μm to 5 μm by means of spacers 97.

As the first electrode is provided with a distribution of projections 201 and concavities 202, when a voltage is applied between the first electrode 92 and the second electrode 95, the electric field resultant in the optical modulation material becomes different at a portion 301 corresponding to a projection 201 and at a portion 302 corresponding to a concavity 202, so that a distribution of dispersely varying electric fields is formed. More specifically, a higher electric field is applied to the portion 301 corresponding to the projection 201 than to the portion 302. This is explained further with reference to FIG. 10, which is a schematic plan view of a portion of the substrate 9 corresponding to a pixel of the optical modulation device.

Figure 10:
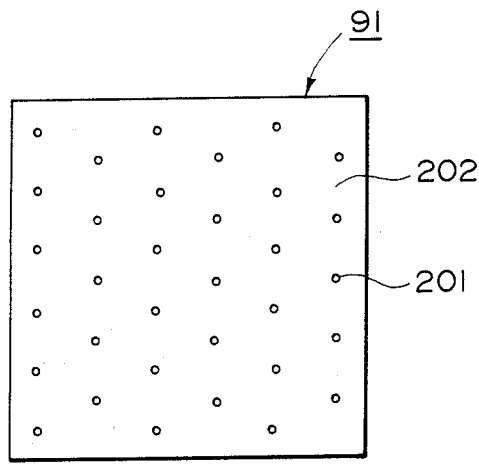
FIG. 10 is a plan view thereof.

In FIG. 10, reference numeral 201 denotes a projection as described above and 202 a concavity as described above.

The projections 201 described above may be provided by a method of sand blasting or a method of first forming a uniform electroconductor film and then discretely depositing spots of an electroconductive substance as will be explained in specific examples set forth hereinafter.

By using a cell having a structure as described above, the inversion of state of an optical modulation device under voltage application explained with reference to FIG. 5 may be caused intentionally and in a regulated manner. An actual example of a set of inversion states corresponding to FIG. 5 is shown in FIGS. 11A–11B wherein reference numeral 111 denotes an inversion nucleus and 112 an inverted region.

In this way, the present invention provides a device capable of effecting a method wherein an inversion nucleus is intentionally formed in a pixel and is enlarged into an inverted region. Thus, a portion 301 of a ferroelectric liquid crystal corresponding to a projection 201 on the first electrode 92 is placed in a relatively high electric field, so that a substantial inversion is started with the portion 301 as the center to form an inverted region. The size of the inverted region growing around the portion 301 is determined depending on the number of pulses, duration, and peak-value of pulse signals.

More specifically, the device may be used to provide a gradational display by using driving methods as explained with reference to FIGS. 6 to 8.

Hereinbelow, specific examples are explained.

EXAMPLE 1

On a glass substrate, an ITO electrode layer was formed in a uniform thickness of about 4000 Å by sputtering and subjected uniformly and all over to surface roughening by collision with abrasive particles of 400 to 800 mesh. On the roughened electrode surface, an about 1000 Å-thick $SiO_2$ film as an electrode protective layer was formed by electron beam - sputtering, and an alignment control layer of polyvinyl alcohol was formed, by spinner coating or dipping, in a thickness of about 1000 Å. Further, the alignment control layer was subjected to rubbing to obtain one electrode plate. Another opposite electrode plate was prepared by coating a glass substrate with a uniform ITO layer and a uniform alignment control film of polyvinyl alcohol subjected to rubbing as described above.

A cell was prepared by using the two electrode plates obtained above and a ferroelectric liquid crystal composition ("CS-1014", mfd. by Chisso K.K.) was injected into the cell to obtain a ferroelectric liquid crystal device.

The thus obtained ferroelectric liquid crystal device was subjected to application of pulse signals as shown in FIGS. 6A–6D having a peak value of 12 V and pulse durations of 50 μsec, 75 μsec, 100 μsec and 125 μsec, respectively, whereby formation of inverted nuclei or regions shown in FIGS. 11A–11D was observed.

EXAMPLE 2

On a glass substrate, an about 3000 Å-thick ITO electrode film was formed similarly as in Example 1, and ITO was further deposited thereon in a thickness of about 100 Å through a mask of 400 mesh by sputtering to provide an uneven electrode surface, which was then coated with an $SiO_2$ electrode protective layer and an alignment control layer of polyvinyl alcohol subjected to rubbing similarly as in Example 1. Thus, one electrode plate was prepared.

The other electrode plate was prepared in the same manner as in Example 1.

A ferroelectric liquid crystal device was prepared in the same manner as in Example 1 except that the above electrode plates were used. The thus obtained ferroelectric liquid crystal device provided substantially the same performances as in Example 1.

In the above Examples 1 and 2, uneven electrodes were formed on only one substrate. However, such uneven electrodes may be formed on both substrates in the present invention.

EXAMPLE 3

On a glass plate, an ITO electrode was formed in a uniform thickness of 3000 Å, and an 800 Å-thick polyvinyl alcohol film was formed thereon. Further, on the polyvinyl alcohol film, a photosensitive polyimide precursor ("PIQ", mfd. by Hitachi Kasei K.K.) was applied to form a 200 Å-thick film, followed by example to a xenon lamp through a mask of 800 mesh, development and rubbing treatment to prepare an electrode plate.

Two electrode plates were prepared in the above manner. On one of them, spherical silica beads of about 1.2 μm diameter were distributed, and the other electrode plate was superposed thereon so that their rubbing directions were parallel to each other to prepare a cell. The ferroelectric liquid crystal composition used in Example 1 was injected and hermetically sealed in the cell to prepare a ferroelectric liquid crystal device. The thus obtained device was subjected to a gradation display test similarly as in Example 1, whereby similar performances were obtained.

According to another embodiment of the present invention, an ITO film is formed on a substrate of, e.g., glass or a plastic and is then coated with a conductive transparent film of a relatively high resistivity, e.g., an $SnO_2$ film in a thickness of about 3000 Å. On the film is further deposited a metal of a relatively low resistivity such as Au and Al in a distributed form through a mesh or by another way, which metal is then subjected to terminal diffusion to dope the $SnO_2$ film with the metal. Thereafter, excess metal is removed by etching to leave distributed doped portions of a relatively low resistivity in the $SnO_2$. Thereafter, an electrode protective layer and an alignment control layer are disposed to prepare an electrode plate, which is capable of providing a distribution of subtly varying electric field as described above applied to an optical modulation material.

As described above, according to the present invention, there is provided an optical modulation device adapted to a display panel with pixels arranged at a high density or an optical shutter array. Furthermore, there is provided a ferroelectric liquid crystal device which is adapted to a display panel for providing a gradational display by simply changing the duration, number, or peak-value of pulse signals depending on given gradation data.

What is claimed is:

1. An optical modulation device, comprising: a plurality of pixels arranged two-dimensionally, each pixel comprising a first electrode and a second electrode disposed opposite to each other and an optical modulation material disposed between the first and second electrodes; each pixel having regions with mutually different uniaxial alignment control powers for aligning the optical modulation material.

2. A device according to claim 1, wherein said optical modulation material is a ferroelectric liquid crystal.

3. A device according to claim 2, wherein said ferroelectric liquid crystal is a chiral smectic liquid crystal.

4. A device according to claim 3, wherein said chiral smectic liquid crystal is formed in a layer thin enough to release its own helical structure under no electric field.

5. A device according to claim 1, wherein said regions of the pixel with different control powers correspond to different regions of an alignment control layer.

6. A device according to claim 5, wherein said alignment control layer comprises an organic polymer layer.

7. A device according to claim 1, wherein said plurality of pixels are arranged in a plurality of rows and a plurality of columns, each row of pixels are commonly connected to a scanning electrode, and each column of pixels are commonly connected to an information electrode; the device further comprising means for applying to the information electrode a pulse signal depending on given gradation data.

8. A device according to claim 7, wherein said pulse signal has a pulse duration depending on given gradation data.

9. A device according to claim 7, wherein said pulse signal has a number of pulses depending on given gradation data.

10. A device according to claim 7, wherein said pulse signal has a peak value depending on given gradation data.

11. A device according to claim 7, wherein said pulse signal is applied after the optical modulation material in the pixel concerned has been oriented to one stable state.

12. A device according to claim 1, wherein said regions with mutually different alignment control powers comprise first alignment control power regions and a second alignment control power region, said first alignment control power regions being dispersely distributed in said second alignment control power region.

13. An optical modulation device comprising: a plurality of pixels arranged two-dimensionally, each pixel comprising a first electrode and a second electrode disposed opposite to each other with an optical modulation material disposed between the first and second electrodes; each pixel having portions capable of having a locally different electric field intensity distributed dispersely in the pixel when an electric field is applied between the first and second electrodes wherein said portions having a locally different electric field intensity correspond to portions of the optical modulation material generating nuclei for initiating modulation.

14. A device according to claim 13, wherein the portions of a locally different electric field intensity correspond to minute projections produced in the pixel.

15. A device according to claim 14, wherein the portions of a locally different electric field intensity correspond to low-resistivity portions formed on at least one of the first and second electrodes.

16. A device according to claim 13, wherein said electric field applied between the first and second electrodes is given by a pulse signal having a duration depending on given gradation data.

17. A device according to claim 13, wherein said electric field applied between the first and second electrodes is given by a pulse signal having a number of pulses depending on given gradation data.

18. A device according to claim 13, wherein said electric field applied between the first and second electrodes is given by a pulse signal having a peak value depending on given gradation data.

19. A device according to claim 13, wherein said optical modulation material is a ferroelectric liquid crystal.

20. A device according to claim 19, wherein said ferroelectric liquid crystal is a chiral smectic liquid crystal.

21. A device according to claim 20, wherein said chiral smectic liquid crystal is formed in a layer thin enough to release its own helical structure under no electric field.

* * * * *

UNITED STATES PATENT AND TRADEMARK OFFICE
CERTIFICATE OF CORRECTION

PATENT NO. : 4,796,980
DATED : January 10, 1989
INVENTOR(S) : SHUZO KANEKO, ET AL.

It is certified that error appears in the above-identified patent and that said Letters Patent is hereby corrected as shown below:

COLUMN 1

Line 64, "twodimensionally" should read --two-dimensionally--.

COLUMN 2

Line 8, "twodimen-" should read --two-dimen--.

Line 57, "G phase (SmC*) should read --G phase (SmG*)--.

COLUMN 3

Line 12, "example," should read --example--.

Line 34, "other are dispsed" should read --other, are disposed--.

COLUMN 6

Line 62, "retians" should read --retains--.

COLUMN 7

Line 48, "substrate 9" should read --substrate 91--.

COLUMN 9

Line 3, "example" should read --exposure--.

UNITED STATES PATENT AND TRADEMARK OFFICE
CERTIFICATE OF CORRECTION

PATENT NO. : 4,796,980

DATED : January 10, 1989

INVENTOR(S) : SHUZO KANEKO, ET AL.

It is certified that error appears in the above-identified patent and that said Letters Patent is hereby corrected as shown below:

COLUMN 10

Line 24, "device" should read --device,--.

Line 52, "claim 13;" should read --claim 13,--

Signed and Sealed this

Nineteenth Day of September, 1989

Attest:

DONALD J. QUIGG

Attesting Officer

Commissioner of Patents and Trademarks